(12) United States Patent
Sato et al.

(10) Patent No.: US 11,022,214 B2
(45) Date of Patent: Jun. 1, 2021

(54) TRANSMISSION CONTROL DEVICE

(71) Applicant: Hitachi Automotive Systems, Ltd., Hitachinaka (JP)

(72) Inventors: Yasuaki Sato, Hitachinaka (JP); Hideki Sekiguchi, Hitachinaka (JP); Hiroyuki Sakamoto, Hitachinaka (JP)

(73) Assignee: Hitachi Automotive Systems, Ltd., Hitachinaka (JP)

(*) Notice: Subject to any disclaimer, the term of this patent is extended or adjusted under 35 U.S.C. 154(b) by 0 days.

(21) Appl. No.: 16/629,623

(22) PCT Filed: Jun. 19, 2018

(86) PCT No.: PCT/JP2018/023194
§ 371 (c)(1),
(2) Date: Jan. 9, 2020

(87) PCT Pub. No.: WO2019/021687
PCT Pub. Date: Jan. 31, 2019

(65) Prior Publication Data
US 2021/0080001 A1    Mar. 18, 2021

(30) Foreign Application Priority Data

Jul. 26, 2017   (JP) .............................. JP2017-144298

(51) Int. Cl.
*F16H 61/02*      (2006.01)
*F16H 59/60*      (2006.01)
(Continued)

(52) U.S. Cl.
CPC ......... *F16H 61/0213* (2013.01); *F16H 59/44* (2013.01); *F16H 59/48* (2013.01); *F16H 59/60* (2013.01); *F16H 2061/0234* (2013.01)

(58) Field of Classification Search
CPC .......... F16H 59/44; F16H 59/48; F16H 59/60; F16H 61/02; F16H 61/0213;
(Continued)

(56) References Cited

U.S. PATENT DOCUMENTS

2009/0319126 A1   12/2009   Miyajima et al.
2009/0319138 A1   12/2009   Kondou et al.
(Continued)

FOREIGN PATENT DOCUMENTS

JP    2010-1973 A    1/2010
JP    2010-1974 A    1/2010
(Continued)

OTHER PUBLICATIONS

International Search Report (PCT/ISA/210) issued in PCT Application No. PCT/JP2018/023194 dated Oct. 9, 2018 with English translation (four (4) pages).
(Continued)

*Primary Examiner* — Edwin A Young
(74) *Attorney, Agent, or Firm* — Crowell & Moring LLP

(57) ABSTRACT

Provided is a transmission control device which can improve drivability in an acceleration section even while taking a reduction of fuel consumption in a deceleration section into consideration. The transmission control device (transmission controller) which controls a transmission in a running control of a vehicle includes a shift timing calculation unit which determines an acceleration position at which the vehicle accelerates on the basis of a target speed pattern generated from external information, a target gear ratio calculation unit which determines a required gear ratio which is required at the acceleration position, and a gear ratio overwriting command unit which outputs a command of overwriting the gear ratio such that the gear ratio at the acceleration position approaches the required gear ratio. In
(Continued)

the control of the transmission of the transmission controller, the gear ratio is set to the required gear ratio (target gear ratio) at a predetermined point after the vehicle exits the deceleration section and reaches the acceleration position.

6 Claims, 10 Drawing Sheets

(51) Int. Cl.
     *F16H 59/48*       (2006.01)
     *F16H 59/44*       (2006.01)

(58) Field of Classification Search
     CPC ....... F16H 2061/0234; F16H 2061/022; F16H 2061/0223
     See application file for complete search history.

(56) References Cited

U.S. PATENT DOCUMENTS

| | | |
|---|---|---|
| 2009/0319139 A1 | 12/2009 | Kondou et al. |
| 2010/0324796 A1* | 12/2010 | Takeuchi ............ F16H 61/0213 701/70 |
| 2013/0173084 A1* | 7/2013 | Tagawa .............. G01C 21/3407 701/1 |
| 2016/0019792 A1* | 1/2016 | Kawamata ........... G07C 5/0816 701/70 |
| 2016/0272213 A1 | 9/2016 | Yamanaka et al. |
| 2017/0043776 A1* | 2/2017 | Sujan .................... F02D 41/021 |
| 2017/0284537 A1* | 10/2017 | Kojima ................ F16H 61/0204 |
| 2020/0096097 A1* | 3/2020 | Ooshima ............. F16H 61/0204 |

FOREIGN PATENT DOCUMENTS

| | | |
|---|---|---|
| JP | 2010-3013 A | 1/2010 |
| JP | 2010-14247 A | 1/2010 |
| JP | 2010-30394 A | 2/2010 |
| JP | 2010-53896 A | 3/2010 |
| JP | 2016-173177 A | 9/2016 |

OTHER PUBLICATIONS

Japanese-language Written Opinion (PCT/ISA/237) issued in PCT Application No. PCT/JP2018/023194 dated Oct. 9, 2018 (six (6) pages).

\* cited by examiner

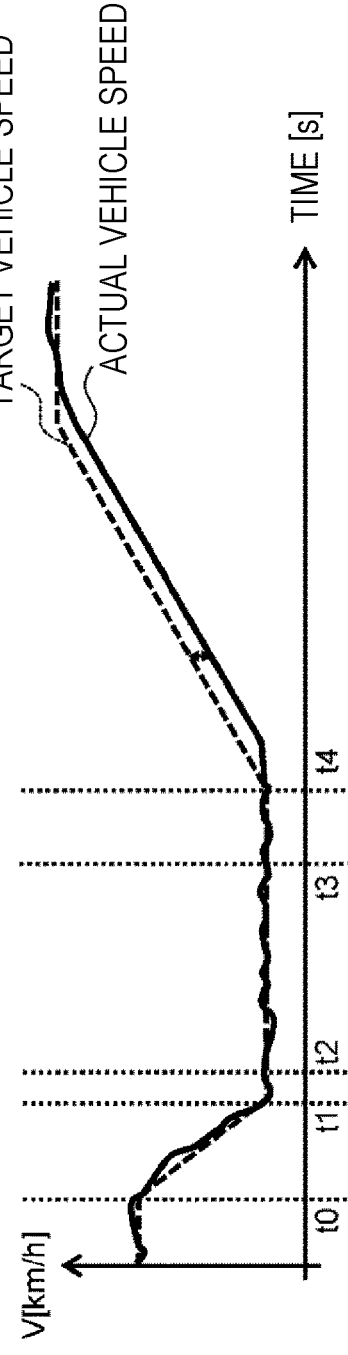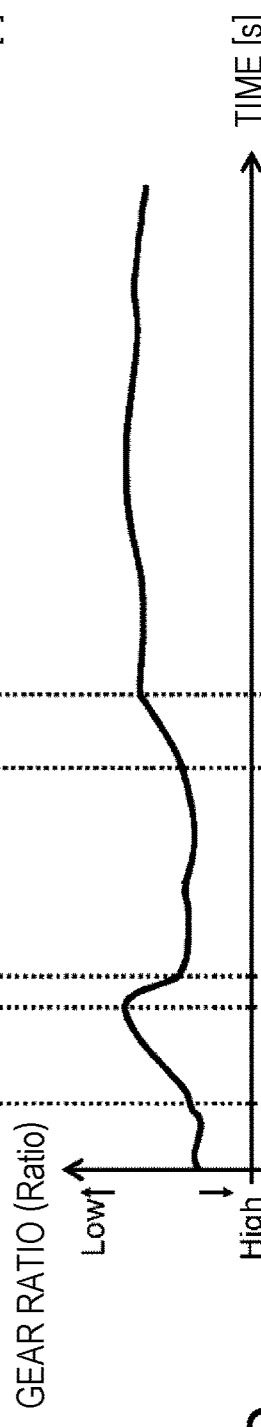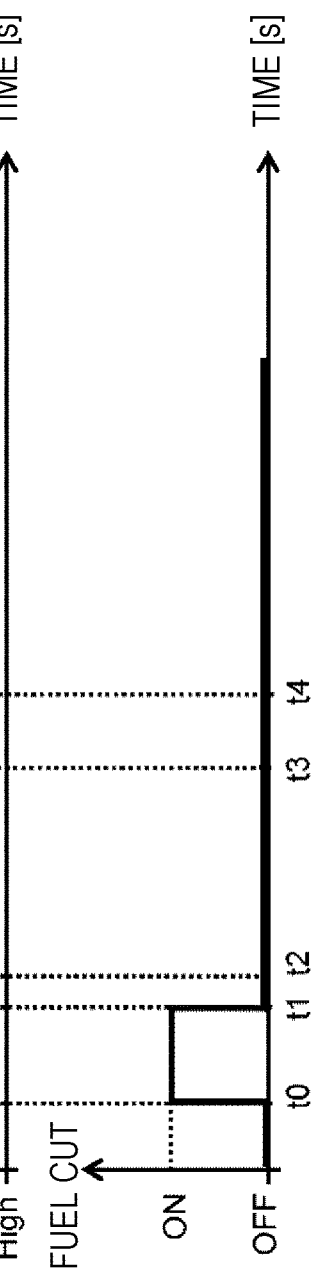

TRANSMISSION CONTROL DEVICE

TECHNICAL FIELD

The present invention relates to a transmission control device, and is preferably applied to a transmission control device which controls a transmission of a vehicle.

BACKGROUND ART

Conventionally, in a running control of a vehicle such as an automobile, a target speed pattern is set in consideration of fuel consumption when the vehicle runs around a corner, and a running control is performed on the basis of the target speed pattern.

For example, PTL 1 discloses a driving support method in which an acceleration gear ratio required at the exit of the corner is determined, the gear ratio is changed to the acceleration gear ratio during deceleration when the vehicle enters the corner, and the gear ratio is fixed to the acceleration gear ratio even during the vehicle runs around the corner so as to secure a deceleration force during the deceleration and to secure an acceleration performance at the exit of the corner.

CITATION LIST

Patent Literature

PTL 1: JP 2010-030394 A

SUMMARY OF INVENTION

Technical Problem

However, as described above, in a case where the target speed pattern is set to perform the running control, a running environment of the vehicle varies. Therefore, an actual vehicle speed following the target speed pattern is difficult to be realized in some cases. Specifically, for example, if the corner is inclined, and the vehicle runs on the slope at a gear ratio similar to that of a flat road, there is a concern that deviation occurs between the target speed pattern and the actual vehicle speed, and drivability is lowered without obtaining sufficient acceleration performance.

In addition, as described in PTL 1, the acceleration gear ratio is determined in consideration of fuel consumption in the acceleration section (for example, the exit of the corner). In a case where the gear ratio is changed from a deceleration section before the acceleration section (for example, when the vehicle enters a corner) to the acceleration gear ratio, the reduction of fuel consumption in the deceleration section is not expected.

The present invention has been made in view of the above problem, and an object thereof is to provide a transmission control device which can improve drivability in an acceleration section even while taking a reduction of fuel consumption in the deceleration section into consideration.

Solution to Problem

In the present invention to solve the above problem, there is provided a transmission control device which controls a transmission in a running control of a vehicle to accelerate the vehicle in an acceleration section after decelerating the vehicle in a deceleration section. The transmission control device includes a shift timing calculation unit which determines an acceleration position at which the vehicle accelerates on a basis of a target speed pattern generated from external information, a target gear ratio calculation unit which determines a required gear ratio which is required at the acceleration position, and a gear ratio overwriting command unit which outputs a command of overwriting the gear ratio such that the gear ratio at the acceleration position approaches the required gear ratio. The gear ratio is set to the required gear ratio at a predetermined point after the vehicle exits the deceleration section until reaching the acceleration position.

Advantageous Effects of Invention

According to the present invention, it is possible to provide a transmission control device which can improve drivability in an acceleration section even while taking a reduction of fuel consumption in a deceleration section into consideration.

BRIEF DESCRIPTION OF DRAWINGS

FIGS. 10A to 10D are diagrams for describing an example of a change in various types of parameters according to the transmission control process.

DESCRIPTION OF EMBODIMENTS

Hereinafter, embodiments of the present invention will be described in detail with reference to the drawings.

(1) Schematic Configuration of Vehicle

Figure 1:
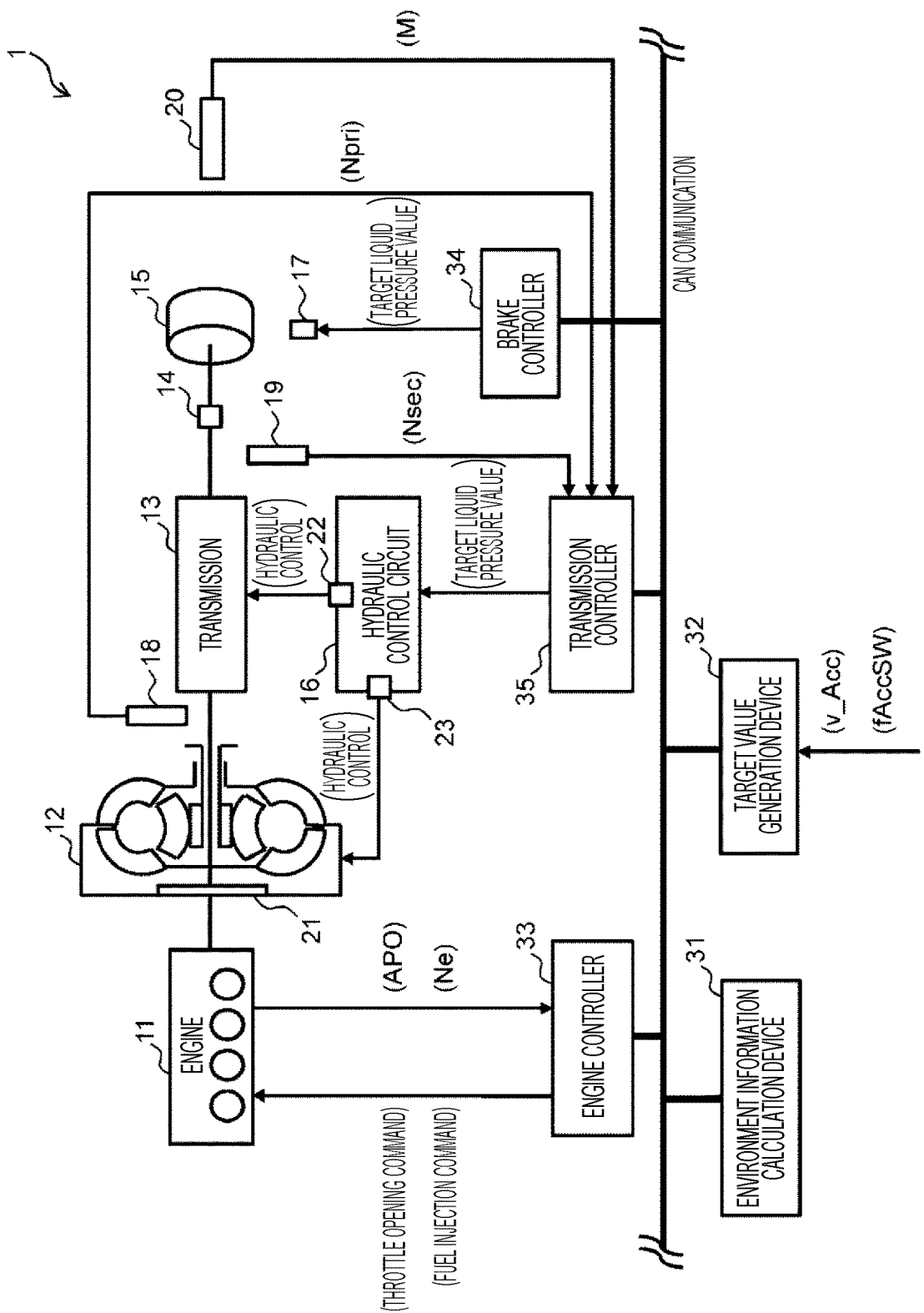
FIG. 1 is a diagram illustrating an example of a schematic configuration of a vehicle where a transmission control device according to an embodiment of the present invention is mounted.

FIG. 1 is a diagram illustrating an example of a schematic configuration of a vehicle where a transmission control device according to an embodiment of the present invention is mounted.

FIG. 1 illustrates a partial configuration of a vehicle 1 to describe an embodiment of the present invention. FIG. 1 illustrates an engine 11, a torque converter 12, a transmission 13, a differential device 14, a tire 15, a hydraulic control circuit 16, a braking device 17, a primary rotation sensor 18, a secondary rotation sensor 19, a vehicle mass sensor 20, a lock-up clutch 21, and solenoids 22 and 23 as the components having a mechanical function. In addition, FIG. 1 illustrates an environment information calculation device 31, a target value generation device 32, an engine controller 33, a brake controller 34, and a transmission controller 35 as a calculation device having an arithmetic function.

The functions and interrelation of the configurations illustrated in FIG. 1 will be described.

The engine 11 is, for example, an internal combustion engine which transfers a rotational force (torque) of the output shaft which is generated by the driving of the engine 11 to the torque converter 12. The engine 11 may be a motor.

The torque converter 12 is a device which transfers torque, and transfers the rotational force of the output shaft of the engine 11 to the transmission 13. In addition, the torque converter 12 includes the lock-up clutch 21 to improve a transfer efficiency of torque. Specifically, the input and output shafts of the torque converter 12 enter a direct coupled condition by engaging the lock-up clutch 21 (hereinafter, referred to as On state), and a transfer loss in the torque converter 12 can be reduced. Further, the present embodiment is not limited to the configuration where the torque converter 12 is provided. As an alternative configuration, a clutch made of, for example, friction engagement elements may be used.

The transmission 13 is a continuously variable automatic transmission made of friction engagement elements (not illustrated) such as a planetary gear mechanism, a clutch, and a brake, and decelerates or accelerates the rotational force transferred from the torque converter 12 to transfer the force to the differential device 14. Generally, a belt-pulley CVT (Continuously Variable Transmission) is used for the transmission 13. The belt-pulley CVT can select any gear ratio from among numberless gear ratios created by a pulley ratio between an input shaft pulley and an output shaft pulley. A transmission mechanism of the transmission 13 is operated by hydraulic control of the hydraulic control circuit 16.

The differential device 14 is a device which transfers the rotational force transferred from the transmission 13 to the tire 15.

The braking device 17 is a control device which generates a liquid pressure corresponding to a target liquid pressure value received from the brake controller 34 to generate a braking force on the tire 15.

The primary rotation sensor 18 is a sensor which detects a primary rotation speed "Npri" indicating an input rotation speed of the transmission 13.

The secondary rotation sensor 19 is a sensor which detects a secondary rotation speed "Nsec" indicating an output rotation speed of the transmission 13.

The vehicle mass sensor 20 is a sensor which detects a mass of the vehicle 1 (own vehicle) and a mass of a towed vehicle. Herein, the detection of the mass of the own vehicle can be obtained by correcting a reference vehicle mass value on the basis of subsidence of a suspension. The mass of the towed vehicle can be measured on the basis of a distortion amount when the vehicle 1 departs in a vehicle towing unit (not illustrated) which tows the towed vehicle. The vehicle mass sensor 20 sends vehicle mass information (vehicle mass "M") indicating the detected mass to the transmission controller 35.

The environment information calculation device 31 is a device which includes a sensing device such as a GNSS (Global Navigation Satellite System), a camera, and a radar, and calculates/generates the environment information (running environment information and obstacle environment information), and sends the obtained environment information to the target value generation device 32.

The environment information generated by the environment information calculation device 31 may be roughly divided into the running environment information related to a running state of the vehicle 1 and the obstacle environment information related to a relative relation between the vehicle 1 and an obstacle. As a specific example of the running environment information, there are gradient information "θ" and the rolling resistance "μ" of the road surface where the vehicle is running, and latitude information "Latitude" and longitude information "Longitude" of the vehicle 1. As a specific example of the obstacle environment information, there are a relative distance "Dist_Rela [m]" between the vehicle 1 and the obstacle, a relative speed "v_Rela [m/s]" with respect to the obstacle, and a relative acceleration "a_Rela [m/s^2]" with respect to the obstacle.

For example, in a case where there is an obstacle (specifically, a preceding vehicle, a following vehicle, a person, a blind corner, etc.), the environment information may be generated using relative value information obtained from a sensing device such as a camera or a sensor. In addition, the rolling resistance "μ" and the road surface gradient "θ" of the road surface in weather such as raining, snowing, and clear sky may be estimated and calculated using a signal of a vehicle-vehicle communication or a road-vehicle communication. The environment information calculation device 31 may generate, for example, a signal status of a front intersection and traffic jam information as the obstacle environment information in addition to the above information.

The target value generation device 32 is a device which generates a target value related to the running of the vehicle 1 on the basis of various types of input information, and has an arithmetic function to generate a target value.

The target value generation device 32 receives the environment information from the environment information calculation device 31, and receives time information "T", an engine speed "Ne", and a gear ratio "Ratio" from the transmission controller 35. In addition, the target value generation device 32 receives ON/OFF information "fAccSW" of a switch (SW) such as CC (Cruise Control) and ACC (Adaptive Cruise Control) and a driver setting speed "v_Acc" as setting information of a driver. Then, the target value generation device 32 generates a target speed "v*" and a target acceleration "a*" on the basis of the received information. Specifically, for example, the target value generation device 32 generates the target speed "v*" and the target acceleration "a*" on the basis of a vehicle speed which is created from the driver setting speed "v_Acc", the latitude information "Latitude", the longitude information "Longitude", and the gradient information "θ", a vehicle speed which is created from the obstacle environment information, and a vehicle speed which is created from the signal status of the front intersection and the traffic jam information.

In addition, the target value generation device 32 creates the target speed "v*(T)" after T seconds, a target acceleration "a*(T)" after T seconds, gradient information "θ(T)" after T seconds, and the rolling resistance value "μ(T)" after T seconds with respect to the time information "T" indicating any previous time from the current time point, and sends the created values to the transmission controller 35. Further, the target value generation device 32 receives the time information "T" from the transmission controller 35.

In addition, the target value generation device 32 calculates a target engine torque "Te*" which is required for the running at the target speed "v*" and the target acceleration "a*", and sends the target engine torque to the engine controller 33.

Further, the present embodiment is not limited to the configuration that the target value generation device 32 is provided. As an alternative configuration, for example, the function of the target value generation device 32 may be provided in the engine controller 33 and the transmission controller 35.

The engine controller 33 is a controller which controls the engine 11, detects an accelerator opening "APO" and the engine speed "Ne" output from the engine 11, and outputs a signal indicating the accelerator opening (a virtual accelerator opening at the time of ACC control or CC control) "APO", the engine speed "Ne", and an engine torque estimation value "Te_est" to the transmission controller 35. Further, the virtual accelerator opening means a virtual accelerator opening corresponding to the target speed and the target acceleration in a situation where the vehicle 1 runs without the need of a driver's pressing on an accelerator like the ACC control and the CC control. In addition, the engine controller 33 receives the target engine torque "Te*", and the ON/OFF information "fAccSW" of the ACC from the target value generation device 32, and sends a torque control signal (throttle opening command) and a fuel injection command to the engine 11.

The brake controller 34 is a controller which controls the braking of the tire 15, and sends the target liquid pressure value to the braking device 17 to brake the tire 15. In addition, when an engine brake and a pad brake operate together in the ACC control and in the CC control, the brake controller 34 receives a liquid pressure command from the transmission controller 35, and sends the target liquid pressure value corresponding to the received liquid pressure command to the braking device 17.

The transmission controller 35 is a controller which controls the transmission 13, and corresponds to an example of the transmission control device according to the present invention. The transmission controller 35 especially generates a target gear ratio on the basis of the information generated by the target value generation device 32, so that the control of the transmission 13 in the automatic driving can be realized.

The transmission controller 35 sends arbitrary time information "T", the engine speed "Ne", and the gear ratio "Ratio" to the target value generation device 32 to obtain the target speed "v*(T)" after T seconds, the target acceleration "a*(T)" after T seconds, the gradient information "θ(T)" after T seconds, and the rolling resistance value "μ(T)" after T seconds from the target value generation device 32. The target value generation device 32 also sends the ON/OFF information "fAccSW" of the ACC.

In addition, in the transmission controller 35, besides the above configuration, the primary rotation speed "Npri" is input from the primary rotation sensor 18, the secondary rotation speed "Nsec" is input from the secondary rotation sensor 19, the accelerator opening "APO", the engine speed "Ne", and the engine torque estimation value "Te_est" are input from the engine controller 33, and the vehicle mass "M" is input from the vehicle mass sensor 20.

In addition, the transmission controller 35 calculates a vehicle speed "v" on the basis of the engine speed "Ne", the accelerator opening "APO", and the secondary rotation speed "Nsec", and calculates the target gear ratio "Ratio" with reference to a predetermined shift map.

Further, the transmission controller 35 calculates a target gear ratio "Ratio*(T)" after T seconds with respect to arbitrary time information "T", and can perform a transmission control process according to the present embodiment on the basis of the target gear ratio "Ratio*(T)" after T seconds and various types of information after T seconds obtained from the target value generation device 32.

Then, the transmission controller 35 outputs a signal (target hydraulic value) to the hydraulic control circuit 16 for the shifting and lock-up control when performing the transmission control process. When the target hydraulic value is input from the transmission controller 35, the hydraulic control circuit 16 controls a supply hydraulic pressure to the lock-up clutch 21 through the solenoid 22 and the supply hydraulic pressure to friction engagement element (not illustrated) of the transmission 13 through the solenoid 23 (hydraulic control).

In addition, the transmission controller 35 controls a predetermined braking force in the pad brake by performing the liquid pressure command by the brake controller 34. More specifically, the brake controller 34 sends the target liquid pressure value to the braking device 17 on the basis of the liquid pressure command from the transmission controller 35. The braking device 17 generates a liquid pressure corresponding to the target liquid pressure value. Thus, a predetermined braking force is generated on the tire 15 by the pad brake.

(2) Transmission Controller

Hereinbelow, the description will be given of a detailed function of the transmission controller 35 which is an example of the transmission control device according to the present invention.

Figure 2:
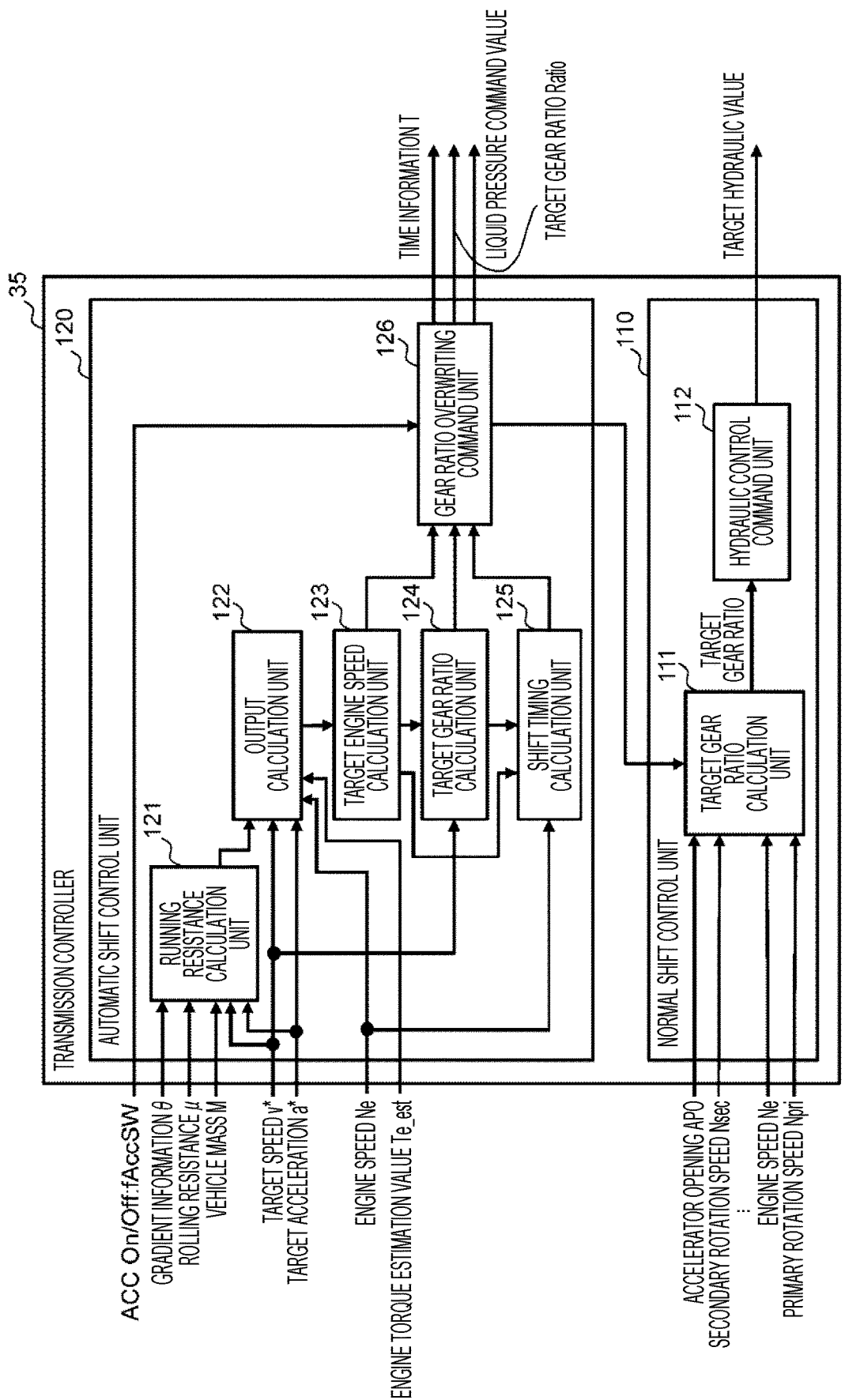
FIG. 2 is a block diagram illustrating an example of a functional configuration of a transmission controller.

FIG. 2 is a block diagram illustrating an example of a functional configuration of the transmission controller. As illustrated in FIG. 2, the transmission controller 35 is configured to include a normal shift control unit 110 which controls the gear ratio in a normal operation state, and an automatic shift control unit 120 which commands to overwrite the target gear ratio in the automatic driving by the ACC control and the CC control.

In a case where the driver presses the accelerator to operate the vehicle 1 (in a case other than the ACC control and the CC control), only the normal shift control unit 110 operates to control the gear ratio. On the other hand, in the case of the automatic driving state (the case of the ACC control and the CC control), the automatic shift control unit 120 operates to calculate the target gear ratio when the ON/OFF information "fAccSW" of the ACC received from the target value generation device 32 is ON. If it is determined that the overwriting of the gear ratio is necessary, the target gear ratio is sent to the normal shift control unit 110 to command the overwriting (see FIG. 3).

The details of the transmission control process of the transmission controller 35 will be described below with reference to a flowchart subsequent to FIG. 3. Hereinbelow, the functional configurations of the normal shift control unit 110 and the automatic shift control unit 120 will be described.

As illustrated in FIG. 2, the normal shift control unit 110 includes a target gear ratio calculation unit 111 and a hydraulic control command unit 112.

The target gear ratio calculation unit 111 has a function of calculating the gear ratio of the transmission 13 which is a continuously variable transmission. The hydraulic control command unit 112 outputs the target hydraulic value as a command to realize the gear ratio which is determined by the target gear ratio calculation unit 111.

More specifically, the target gear ratio calculation unit 111 calculates (generates) the target gear ratio "Ratio", and sends the ratio to the hydraulic control command unit 112 on the basis of the information input to the transmission controller 35 such as the accelerator opening (the virtual accelerator opening at the time of the ACC control or the CC control) "APO", the primary rotation speed "Npri", and the secondary rotation speed "Nsec". Then, the hydraulic control command unit 112 outputs an appropriate hydraulic value (target hydraulic value) to the hydraulic control circuit 16 to operate the transmission 13 at the target gear ratio.

Further, as an example of the target gear ratio described above, the transmission controller 35 may determine the target gear ratio and the target primary rotation speed by another calculation method to command the hydraulic control circuit 16.

Next, as illustrated in FIG. 2, the automatic shift control unit 120 includes a running resistance calculation unit 121, an output calculation unit 122, a target engine speed calculation unit 123, a target gear ratio calculation unit 124, a shift timing calculation unit 125, and a gear ratio overwriting command unit 126.

The running resistance calculation unit 121 has a function of calculating a running resistance value. Specifically, the running resistance calculation unit 121 calculates the running resistance value on the basis of the gradient information "θ", the vehicle mass "M", the rolling resistance "μ", the target speed "v*", and the target acceleration "a*" which are input to the running resistance calculation unit 121, and sends the calculated running resistance value to the output calculation unit 122. In a case where the time information "T" to be sent from the transmission controller 35 (more specifically, the gear ratio overwriting command unit 126) to the target value generation device 32 is obtained other than a method of calculating and sending the current running resistance value, the running resistance calculation unit 121 calculates and sends the running resistance value after T second from the current time on the basis of the input information obtained by the estimation after T seconds.

The output calculation unit 122 has a function of calculating a required engine output. Specifically, in a case where the time information "T" to be sent to the target value generation device 32 is obtained, the output calculation unit 122 calculates the engine output to be required after T seconds, and sends the calculated engine output to the target engine speed calculation unit 123 on the basis of the target speed "v*(T)" after T seconds and the target acceleration "a*(T)" after T seconds which are input from the target value generation device 32, the running resistance value after T seconds to be received from the running resistance calculation unit 121, and the engine speed "Ne" and the engine torque estimation value "Te_est" which are input from the engine controller 33. Further, at this time, the output calculation unit 122 calculates also the current engine output, and sends the engine output to the target engine speed calculation unit 123.

The target engine speed calculation unit 123 has a function of calculating the engine speed to be required to realize the engine output calculated by the output calculation unit 122. Specifically, the target engine speed calculation unit 123 calculates the target rotation frequencies (target engine speed) of the engine 11 at the current time and after T seconds on the basis of the engine outputs at the current time and after T seconds which are received from the output calculation unit 122, and sends the frequencies to the target gear ratio calculation unit 124, the shift timing calculation unit 125, and the gear ratio overwriting command unit 126.

The target gear ratio calculation unit 124 has a function of calculating the target gear ratio to realize the target speed and the target engine speed which are obtained by the calculation. Specifically, the target gear ratio calculation unit 124 calculates a target gear ratio "Ratio*(T)" after T seconds on the basis of the target speed "v*(T)" after T seconds input from the target value generation device 32, and the target engine speed after T seconds calculated by the target engine speed calculation unit 123, and sends the calculated target gear ratio to the shift timing calculation unit 125 and the gear ratio overwriting command unit 126. Further, at this time, the target gear ratio calculation unit 124 calculates also the target gear ratio "Ratio" at the current time, and sends the target gear ratio "Ratio" to the shift timing calculation unit 125 and the gear ratio overwriting command unit 126. In addition, when the target gear ratios "Ratio" and "Ratio*(T)" are calculated, the target speed "v*" at the current time, the target engine speed at the current time, and other information which can be obtained by the transmission controller 35 may also be used.

The shift timing calculation unit 125 has a function of calculating information to determine whether the overwriting of the gear ratio is possible. Specifically, the shift timing calculation unit 125 calculates an engine speed change "ΔNe*" per unit time (the details will be described below with reference to FIG. 9) on the basis of the engine speed "Ne" and the target gear ratio "Ratio", and sends the engine speed change "ΔNe*" to the gear ratio overwriting command unit 126.

The gear ratio overwriting command unit 126 has a function of commanding the overwriting of the target gear ratio when a predetermined condition is satisfied by the input information. Specifically, the gear ratio overwriting command unit 126 determines whether the target gear ratio is overwritten on the basis of the engine speed change "ΔNe*" per unit time received from the shift timing calculation unit 125 when the ON/OFF information "fAccSW" of the ACC received from the target value generation device 32 is ON. In a case where it is determined that the overwriting is necessary, the target gear ratio generated by the target gear ratio calculation unit 124 is sent to the normal shift control unit 110 (the target gear ratio calculation unit 111). The normal shift control unit 110 which receives the overwriting command from the gear ratio overwriting command unit 126 performs control to realize the command target gear ratio.

In addition, the gear ratio overwriting command unit 126 sends the time information "T" to the target value generation device 32, and sends, to the braking device 17 (or the brake controller 34), a liquid pressure command value as much as a braking force to be generated in the pad brake.

(3) Transmission Control Process

The transmission control process of the transmission control device (the transmission controller 35) according to the present embodiment will be described.

Figure 3:
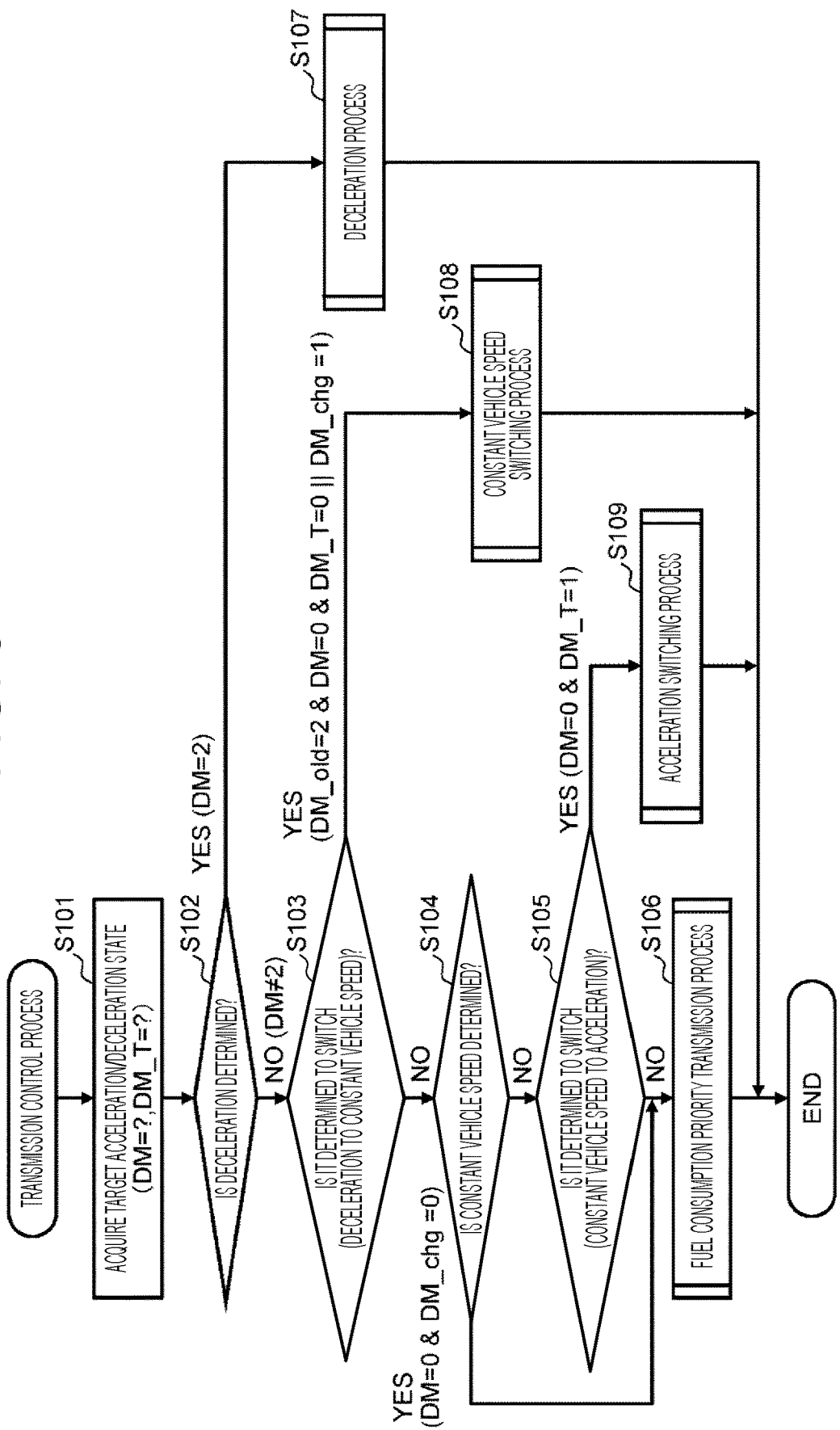
FIG. 3 is a flowchart illustrating an example of a general processing procedure of a transmission control process.

FIG. 3 is a flowchart illustrating an example of a general processing procedure of the transmission control process. The process illustrated in FIG. 3 is an example of the transmission control process when the vehicle speed is controlled by the ACC control and the CC control in the vehicle 1 (when the ON/OFF information "fAccSW" of the ACC is ON), and is mainly performed by each part of the automatic shift control unit 120.

According to FIG. 3, first, in step S101, a target acceleration/deceleration state is acquired on the basis of the target acceleration "a*" input from the target value generation device 32. Specifically, for example, the current target acceleration "a*" is referred. In a case where a*=0, "DM=0 (constant vehicle speed)" is set. In a case where "a*>0", "DM=1 (acceleration state)" is set. In a case where "a*<0", "DM=2 (deceleration state)" is set. "DM" is a parameter indicating the current target acceleration/deceleration state. In addition, even regarding the target acceleration/deceleration state (parameter "DM_T") after T seconds corresponding to the time information "T", the target acceleration "a*(T)" after T seconds is referred. In a case where "a*(T)=0", "DM_T=0 (constant vehicle speed)" is set. In a case where "a(T)*>0", "DM_T=1 (acceleration state)" is set. In a case where "a*(T)<0", "DM_T=2 (deceleration state)" is set.

Figure 4:
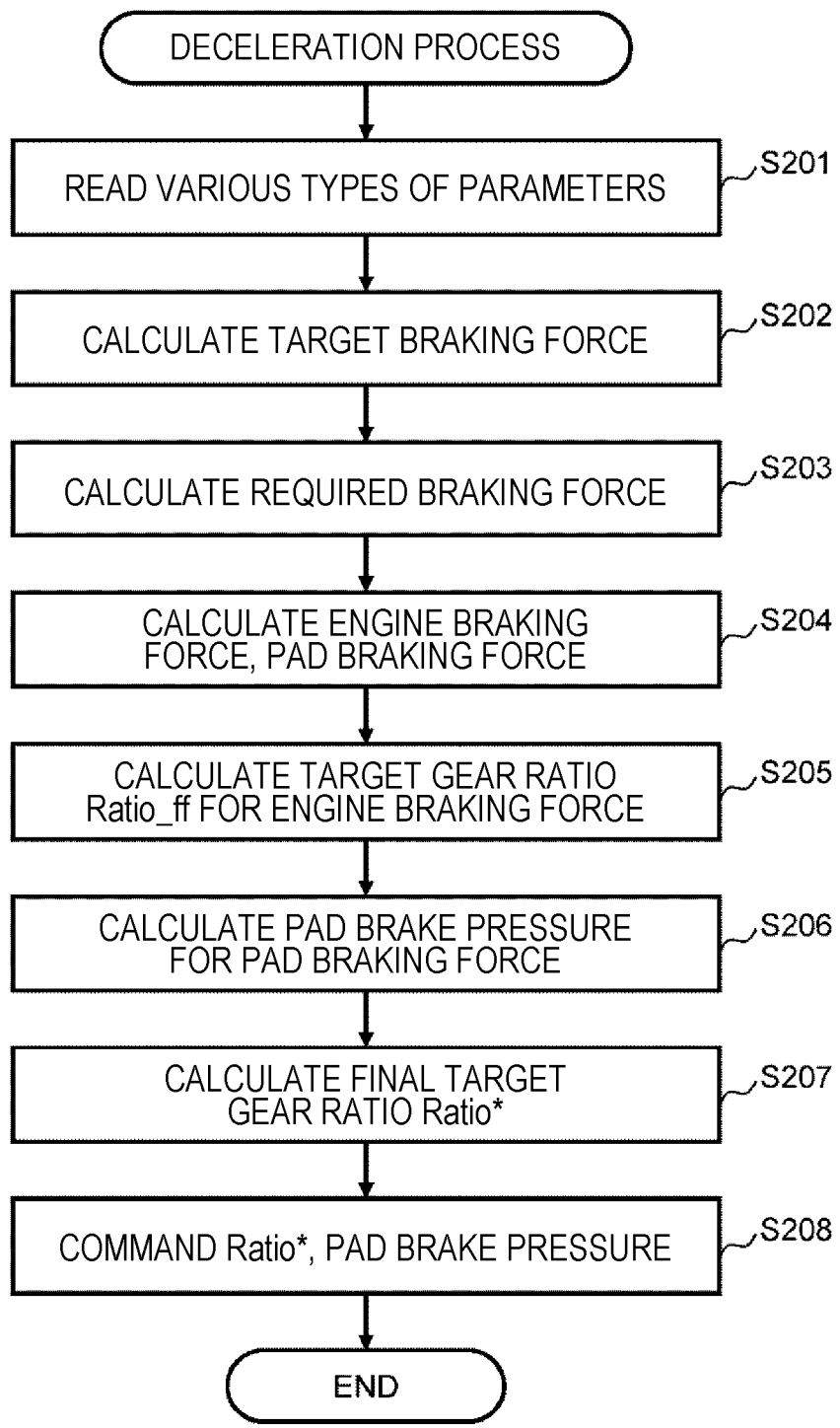
FIG. 4 is a flowchart illustrating an example of the processing procedure of a deceleration process.

In step S102, it is determined whether it is a deceleration state on the basis of the target acceleration/deceleration state acquired in step S101. In a case where it is determined that the state is a deceleration state in step S102 (YES of step S102), a deceleration process is performed in step S107, and the transmission control process ends. The details of the deceleration process are illustrated in FIG. 4. On the other hand, in a case where it is determined that the state is not a deceleration state in step S102 (NO of step S102), the process proceeds to step S103.

Further, FIG. 3 illustrates an example of a specific determination criterion in each determination of steps S102, S103, S104, and S105.

Figure 5:
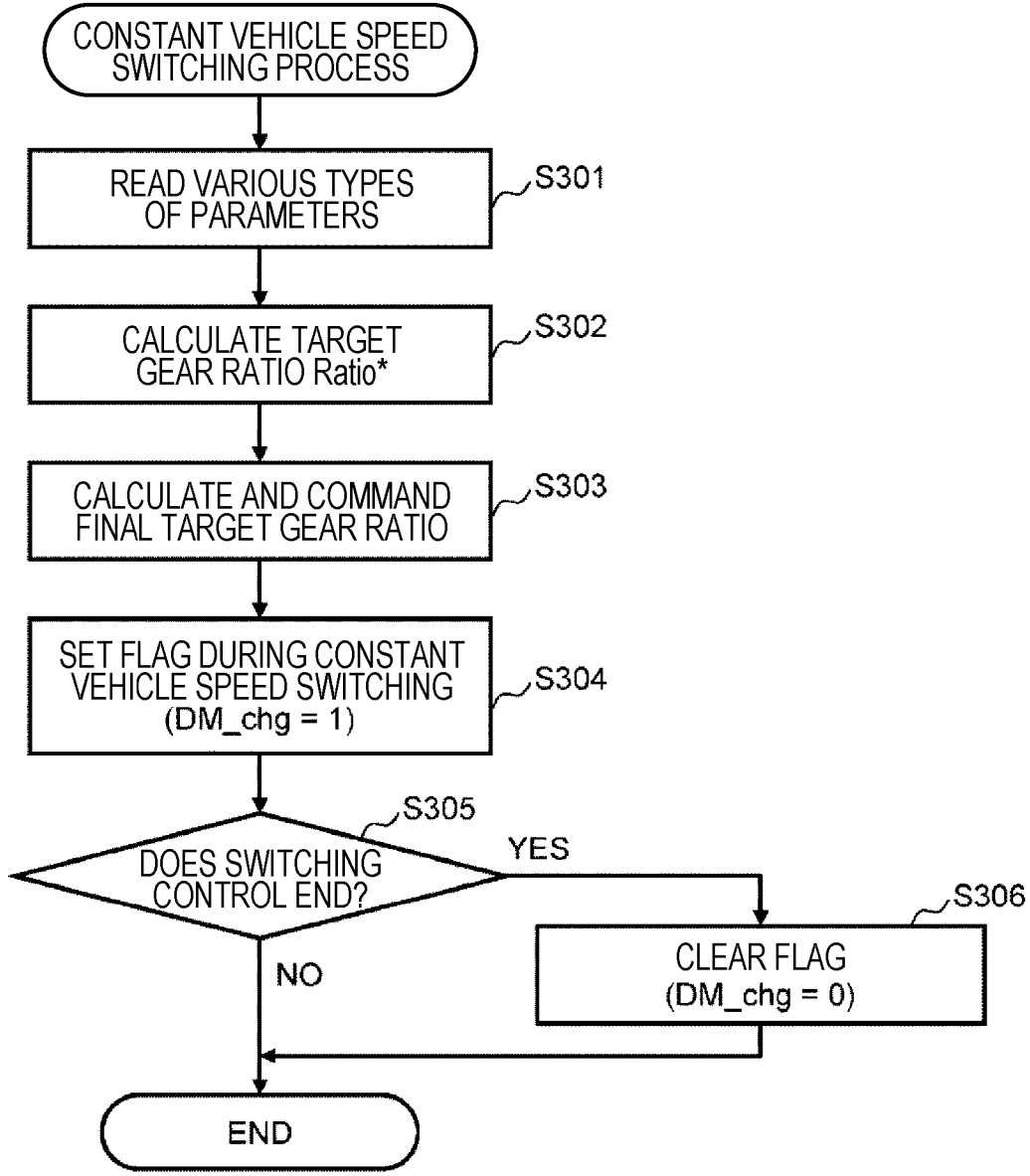
FIG. 5 is a flowchart illustrating an example of the processing procedure of a constant vehicle speed switching process.

In step S103, it is determined whether the state is switched from the deceleration to a constant vehicle speed. In a case where it is determined that the state is switched to the constant vehicle speed in step S103 (YES of step S103), a constant vehicle speed switching process is performed in step S108, and the transmission control process ends. The details of the constant vehicle speed switching process are illustrated in FIG. 5. On the other hand, in a case where it is determined that the state is not switched to the constant vehicle speed in step S103 (NO of step S103), the process proceeds to step S104.

Figure 6:
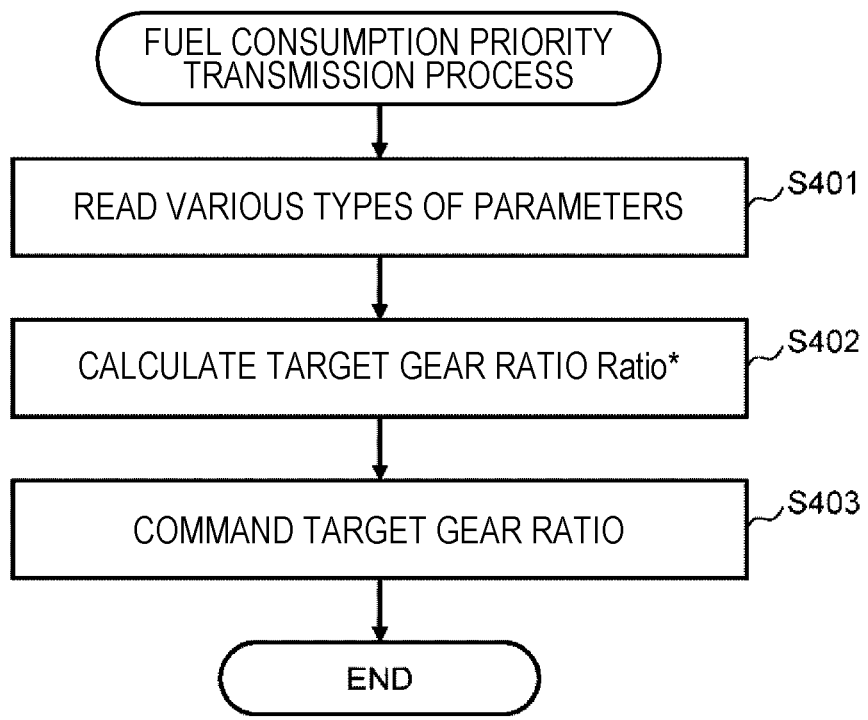
FIG. 6 is a flowchart illustrating an example of the processing procedure of a fuel consumption priority transmission process.

In step S104, it is determined whether the state is a constant vehicle speed state on the basis of the target acceleration/deceleration state acquired in step S101. In a case where it is determined that it is the constant vehicle speed state in step S104 (YES of step S104), a fuel consumption priority transmission process is performed in step S106, and the transmission control process ends. The details of the fuel consumption priority transmission process are illustrated in FIG. 6. On the other hand, in a case where it is determined that the state is not the constant vehicle speed state in step S104 (NO of step S104), the process proceeds to step S105.

Figure 7:
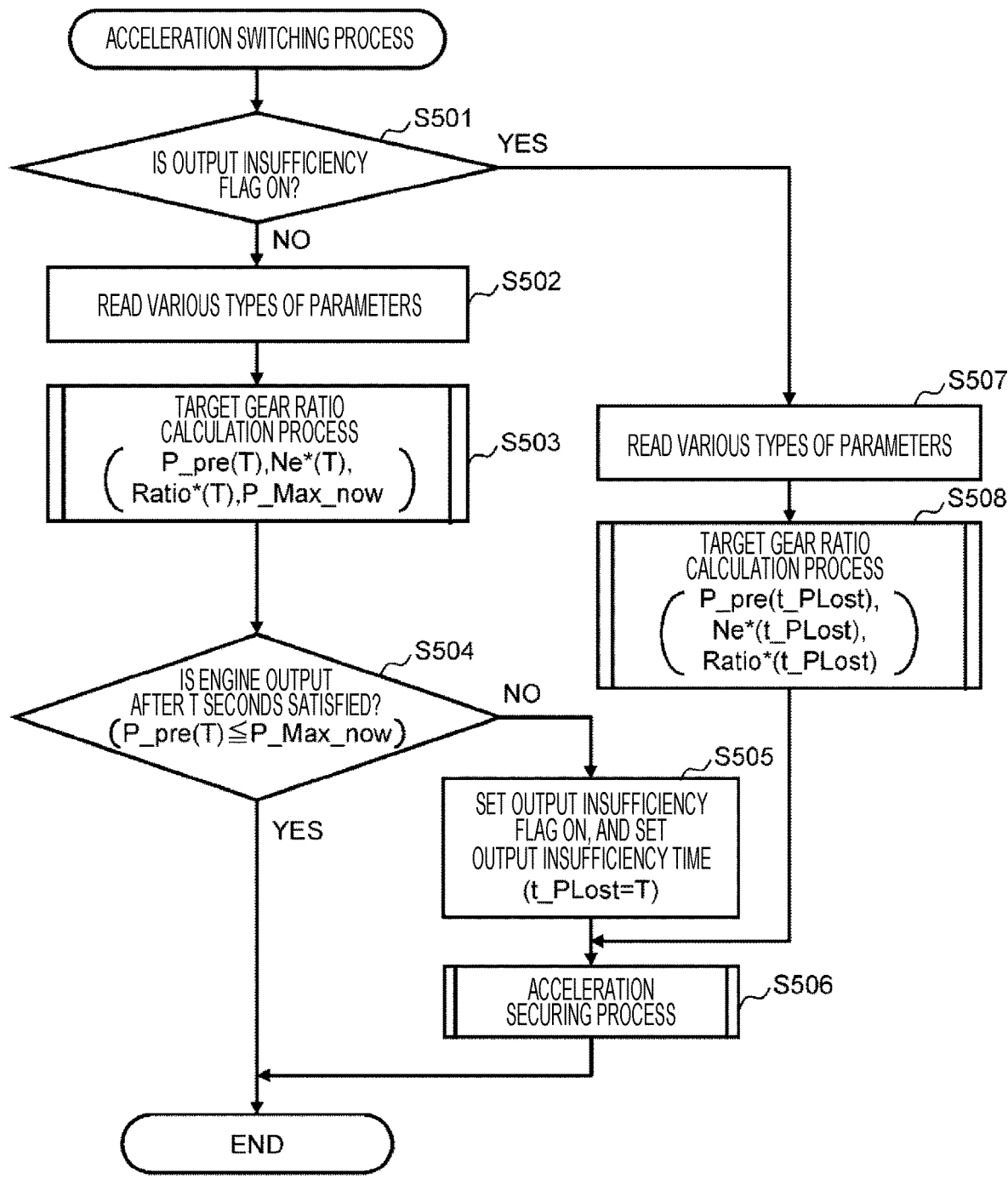
FIG. 7 is a flowchart illustrating an example of the processing procedure of an acceleration switching process.

In step S105, it is determined whether the state is switched from the constant vehicle speed to an acceleration on the basis of the target acceleration/deceleration state acquired in step S101. In a case where it is determined that the state is switched to an acceleration in step S105 (YES of step S105), an acceleration switching process is performed in step S109, and the transmission control process ends. The details of the acceleration switching process are illustrated in FIG. 7. On the other hand, in a case where it is determined that the state is not switched to an acceleration in step S105 (NO of step S105), the fuel consumption priority transmission process is performed in step S106, and the transmission control process ends.

(3-1) Deceleration Process

FIG. 4 is a flowchart illustrating an example of the processing procedure of the deceleration process, and illustrates a detailed processing procedure of the deceleration process of step S107 of FIG. 3.

The deceleration process illustrated in FIG. 4 is a process which is performed when the speed of the vehicle 1 is lowered on the basis of a condition that the target acceleration is "a*<0". A speed control is performed such that a braking force as much as the engine braking does not exceed a target braking force, so that a fuel cut (F/C) time can be kept long.

According to FIG. 4, various types of parameters required for the deceleration control are read in step S201. Specifically, the engine speed "Ne", the secondary rotation speed "Nsec", the target speed "v*", the target acceleration "a*", a fuel cut (F/C) state, the rolling resistance "$\mu$", the vehicle mass "M", and the gradient information "$\theta$" are acquired. In addition, the vehicle speed "v" of the vehicle 1 is calculated on the basis of the acquired secondary rotation speed "Nsec".

In step S202, the target braking force is calculated on the basis of the target acceleration "a*" and the vehicle mass "M" acquired in step S101.

In step S203, a required braking force is calculated on the basis of the target braking force obtained in step S202. There is a relation between the required braking force and the target braking force, that is, "Required braking force−Running resistance value=Target braking force". Therefore, the required braking force can be obtained by a sum of the target braking force and the running resistance value. Further, the running resistance value required in step S203 is a running resistance value at the running site of the current time. In the deduction, the target speed "v*", the target acceleration "a*", the rolling resistance "$\mu$", the vehicle mass "M", and the gradient information "$\theta$" are used. A specific expression of deducing the running resistance value will be described in the explanation of FIG. 8.

In step S204, in consideration of that the sum of an engine braking force and a pad braking force corresponds to the required braking force, a distribution of the braking force (engine braking force) of the engine braking and the braking force (pad braking force) of the pad braking is calculated with respect to the required braking force obtained in step S203. The distribution of the engine braking force and the pad braking force is determined on the basis of distribution map information which is prepared for the distribution. Further, at this time, if the rotation speed of the engine 11 is too high at the time of the engine braking, the engine noises are increased. Therefore, it is preferable that the engine braking force is restricted.

In step S205, a target gear ratio "Ratio_ff" which is required to generate the engine braking force is calculated with respect to the engine braking force distributed in step S204. Specifically, for example, a relation between the engine braking force and the target gear ratio "Ratio_ff" (a predetermined proportional relation in a simplest example) is determined on the basis of predetermined map information. In addition, besides the method, for example, the target gear ratio "Ratio_ff" for the engine braking force may be calculated on the basis of the relational expression "Engine braking force=Engine torque×Ratio_ff×Final deceleration ratio×Transfer efficiency/Tire radius". A feed-forward control (FF control) of the target gear ratio is performed by the process of step S205.

In step S206, a pad brake pressure (liquid pressure command value) which is required for generating the pad braking force is calculated with respect to the pad braking force distributed in step S204. Specifically, for example, a relation between the pad braking force and a liquid pressure value (a predetermined proportional relation in a simplest example) is determined on the basis of predetermined map information.

In step S207, a final target gear ratio "Ratio*" for performing a feed-back control (vehicle speed FB control) on the vehicle speed is calculated using the target gear ratio "Ration_ff" for the engine braking force obtained in step S205. Specifically, for example, the final target gear ratio "Ratio*" is calculated by the following expression (Math. 1).

$$\text{Ratio} = \text{Ratio\_ff} + (kp \times \text{Verr} + ki \times \int \text{Verr}) \quad [\text{Math. 1}]$$

Kp, ki: Constants
Verr: Vehicle speed deviation (=Target vehicle speed "v*"−Actual vehicle speed "v")

In step S208, the pad brake pressure (liquid pressure command value) obtained in step S206 and the target gear ratio "Ratio*" obtained in step S207 are output to perform each control command.

Hitherto, with the deceleration process illustrated in FIG. 4, the transmission controller 35 according to the present embodiment can realize the speed control of deceleration while maintaining the engine speed at which the fuel cut (F/C) is kept. As a result, an increase in a period when fuel is not used is expected, and the running mileage of the vehicle 1 can be improved.

Further, in the control process illustrated in FIG. 4, a typical feed-forward control (FF control) and a typical feed-back control (FB control) have been employed. The deceleration process of the present embodiment can follow the vehicle speed, but the present invention is not limited thereto as long as the control process can make the F/C period long.

(3-2) Constant Vehicle Speed Switching Process

FIG. 5 is a flowchart illustrating an example of the processing procedure of the constant vehicle speed switching process, and illustrates a detailed processing procedure of the constant vehicle speed switching process of step S108 of FIG. 3.

The constant vehicle speed switching process illustrated in FIG. 5 is a process performed when the running state of the vehicle 1 is switched from a deceleration to the constant vehicle speed, in which the gear ratio is smoothly switched from the deceleration state to the constant vehicle speed.

According to FIG. 5, in step S301, various types of parameters required for the switching from a deceleration to the constant vehicle speed are read. Specifically, the engine speed "Ne", the secondary rotation speed "Nsec", the estimation engine torque "Te_est", the target speed "v*", the target speed "v*(T)" after T seconds, the target acceleration "a*", and the target acceleration "a*(T)" after T seconds are acquired. In addition, the vehicle speed "v" of the vehicle 1 is calculated on the basis of the acquired secondary rotation speed "Nsec".

In step S302, the engine output required when the vehicle 1 runs at the constant vehicle speed is calculated on the basis of the parameters acquired in step S301. The target gear ratio "Ratio*" is calculated such that an engine operation point of a less fuel consumption is obtained.

In step S303, in order to avoid that the engine speed is steeply increased when a gear ratio command value is updated, the final target gear ratio "Ratio*" is calculated and commanded while the change in the engine speed is limited. With such a configuration, it is possible to prevent that the drivability is degraded due to the steep change in the engine speed and a torque difference.

In step S304, a flag indicating a constant vehicle speed switching is set. Specifically, for example, "DM_chg=1" is set. The constant vehicle speed switching process is performed while the flag is set.

In step S305, it is determined whether a switching timing of the switching process from a deceleration to the constant vehicle speed ends. Specifically, if the target gear ratio is matched to the final target gear ratio, the constant vehicle speed switching control ends. In a case where it is determined in step S305 that the switching control is in process (NO of S305), the constant vehicle speed switching process ends as it is (actually continues). In a case where it is determined that the switching control ends (YES of step S305), the flag set in step S304 is cleared in step S306 ("DM_chg=0"), and the constant vehicle speed switching process ends.

Hitherto, with the constant vehicle speed switching process illustrated in FIG. 5, the transmission controller 35 according to the present embodiment can realize the speed control in which the engine speed is smoothly changed from an engine speed when the deceleration ends to an engine speed at which the fuel consumption during a constant vehicle speed running is minimized. Then, when the engine speed is switched to the constant vehicle speed running from the deceleration running, the change in the engine speed is made smooth to reduce an uncomfortable feeling of the driver, so that the degradation of drivability can be suppressed.

(3-3) Fuel Consumption Priority Transmission Process

FIG. 6 is a flowchart illustrating an example of the processing procedure of the fuel consumption priority transmission process, and illustrates a detailed processing procedure of the fuel consumption priority transmission process of step S106 of FIG. 3.

The fuel consumption priority transmission process illustrated in FIG. 6 is a process performed when there is no change in the target acceleration/deceleration state (that is, deceleration, constant vehicle speed, or acceleration is maintained). The gear ratio is determined to obtain the engine operation point where the fuel consumption is less.

According to FIG. 6, various types of parameters required for the engine operation point considering the fuel consumption are read in step S401. Specifically, the engine speed "Ne", the secondary rotation speed "Nsec", the estimation engine torque "Te_est", the target speed "v*", and the target acceleration "a*" are acquired. In addition, the vehicle speed "v" of the vehicle 1 is calculated on the basis of the acquired secondary rotation speed "Nsec".

In step S402, the target gear ratio "Ratio*" for performing the fuel consumption priority transmission process is calculated and generated on the basis of the parameters acquired in step S401. Specifically, for example, the current engine output is calculated using the current engine speed "Ne" and the engine torque estimation value "Te_est". The target gear ratio "Ratio*" is calculated such that the engine operation point is optimized for the fuel consumption on the line of the equal engine output obtained by the calculation. Further, an engine torque control according to the gear ratio is performed in the target value generation device 32 so as to follow the target speed.

In addition, in the fuel consumption priority transmission process according to the present embodiment, a specific calculation method of step S402 is not limited to the above configuration. For example, a gear ratio line map with respect to the input information such as the actual vehicle speed "v", the engine speed "Ne", and the virtual accelerator opening signal is prepared in advance, and the target gear ratio "Ratio*" may be calculated by priority of the fuel consumption.

In step S403, the target gear ratio "Ratio*" obtained in step S402 is output to perform the control command.

Hitherto, with the fuel consumption priority transmission process illustrated in FIG. 6, the transmission controller 35 according to the present embodiment can realize the gear ratio control to operate at the engine operation point at which the fuel consumption is minimized. Then, the mileage of the vehicle 1 can be improved by suppressing the fuel consumption less.

(3-4) Acceleration Switching Process

FIG. 7 is a flowchart illustrating an example of the processing procedure of the acceleration switching process, and illustrates a detailed processing procedure of the acceleration switching process of step S109 of FIG. 3.

The acceleration switching process illustrated in FIG. 7 is a process performed when the running state of the vehicle 1 is switched from the constant vehicle speed to an acceleration. The speed control is performed such that a target acceleration can be achieved at the time of switching to the acceleration.

According to FIG. 7, in step S501, it is determined whether the output insufficiency flag is ON. Herein, the output insufficiency flag is a flag indicating whether the engine output after T seconds is insufficient to realize the target speed, and an initial value is OFF (sufficiency). Since the ON setting of the output insufficiency flag is performed in the following step S505, the determination result of step S501 is always NO in the acceleration switching process in an initial state, and the process proceeds to step S502. On the other hand, if the output insufficiency flag is set to ON in the acceleration switching process in the second and subsequent times, the determination result of step S501 becomes YES, and the process proceeds to step S507.

In step S502, various types of parameters required for performing the subsequent acceleration switching process in a situation that the output insufficiency flag is not ON are read. Specifically, the engine speed "Ne", the secondary rotation speed "Nsec", the target speed "v*(T)" after T seconds, the target acceleration "a*(T)" after T seconds, the rolling resistance "μ(T)" after T seconds, the vehicle mass "M", and the gradient information "θ(T)" after T seconds are acquired. In addition, the vehicle speed "v" of the vehicle 1 is calculated on the basis of the acquired secondary rotation speed "Nsec".

In step S503, the target gear ratio "Ratio*(T)" after T seconds if the engine output is not insufficient is calculated on the basis of the parameters acquired in step S502 (target gear ratio calculation process). The details of the target gear ratio calculation process are separately illustrated in FIG. 8. In step S503, a required engine output "P_pre(T)" after T seconds, a maximum engine output "P_Max_now", and a target engine speed "Ne*(T)" after T seconds are calculated. The target gear ratio "Ratio*(T)" after T seconds is calculated on the basis of these parameters.

Next, in step S504, it is determined whether the maximum engine output "P_Max_now" which can be currently output satisfies the engine output after T seconds. Specifically, the current maximum engine output "P_Max_now" as a threshold is compared with the required engine output "P_pre(T)" after T seconds. In a case where the engine output after T seconds is equal to or less than the maximum engine output which can be currently output ("P_pre(T)≤P_Max_now"), it is determined that the condition is satisfied (YES of step S504), and the acceleration switching process ends. In a case where the engine output after T seconds is not equal to or less than the maximum engine output which can be currently output ("P_pre(T)>P_Max_now"), it is determined that the condition is not satisfied (NO of step S504), and the process proceeds to step S505.

In step S505, as a process when the current maximum engine output does not satisfy the engine output after T seconds, the output insufficiency flag is set to ON (the engine output is insufficient), an output insufficiency time "t_PLost" is set to the time information "T", and the process proceeds to step S506. Herein, the output insufficiency flag is a flag which is set to ON in a case where it is determined that the engine output after T seconds is insufficient to realize the target speed (a case where the engine output value after T seconds is less than a predetermined threshold). In addition, the output insufficiency time "t_PLost" indicates a time from the current time point until that the engine output is insufficient, and is set to "T" since it is determined that the engine output after T seconds is insufficient in step S504.

In step S506, the overwriting of the gear ratio is commanded such that the target gear ratio is obtained until the output insufficiency time "t_PLost" elapses, and the output insufficiency is released. As a process of satisfying the target speed and the target acceleration, an acceleration securing process is performed. The details of the acceleration securing process will be illustrated in FIG. 9. Further, while it will be described in FIG. 9, the output insufficiency flag and the output insufficiency time "t_PLost" are cleared in a case where a predetermined condition is satisfied in the acceleration securing process. If the process of step S506 ends, the acceleration switching process ends.

On the other hand, in a case where it is determined that the output insufficiency flag is ON in step S501, various types of parameters required for performing the subsequent acceleration switching process in a situation that the output insufficiency flag becomes ON are read in step S507. Specifically, the engine speed "Ne", the secondary rotation speed "Nsec", a target speed "v*(t_PLost)" after t_PLost seconds, a target acceleration "a*(t_PLost)" after t_PLost seconds, the rolling resistance "μ(t_PLost)" after t_PLost seconds, gradient information "θ(t_PLost)" after t_PLost seconds, and the vehicle mass "M" are acquired. As described above, the time after "t_PLost" seconds is a time until the engine output becomes insufficient.

Figure 8:
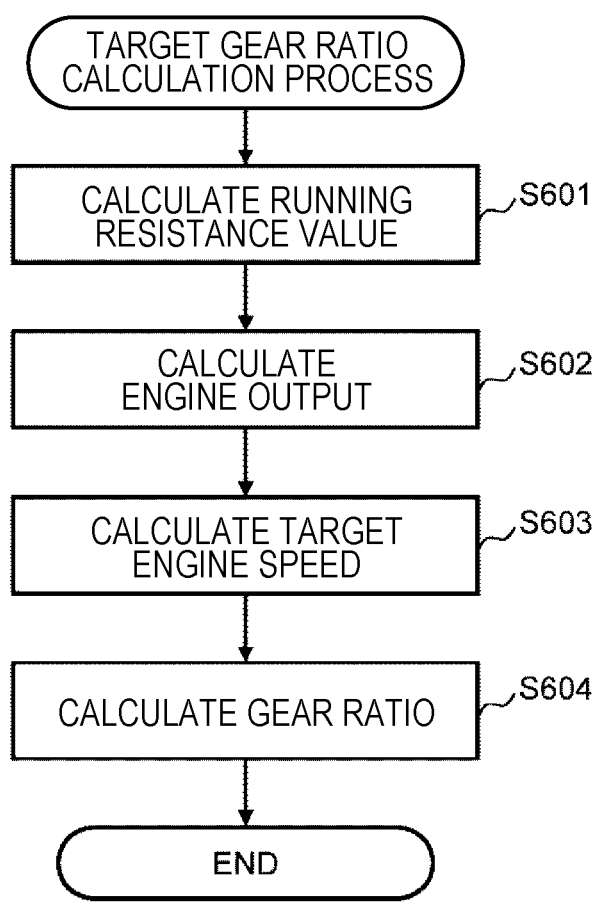
FIG. 8 is a flowchart illustrating an example of the processing procedure of a target gear ratio calculation process.

Next, in step S508, the target gear ratio "Ratio*(t_PLost)" after t_PLost seconds is calculated on the basis of the parameters acquired in step S507 (target gear ratio calculation process). The details of the target gear ratio calculation process of step S508 are illustrated in FIG. 8 similarly to step S503. In step S508, the required engine output "P_pre (t_PLost)" after t_PLost seconds, and a target engine speed "Ne*(t_PLost)" after t_PLost seconds are calculated. A target gear ratio "Ratio*(t_PLost)" after t_PLost seconds is calculated on the basis of these parameters.

After the target gear ratio calculation process is performed in step S508, the acceleration securing process of step S506 is performed, and then the acceleration switching process ends.

Hitherto, with the acceleration switching process illustrated in FIG. 7, the transmission controller 35 according to the present embodiment can control the gear ratio to secure a driving force in a case where it is determined that the driving force (engine output) for satisfying a future target acceleration is insufficient. Specifically, in a case where the driving force is insufficient, the gear ratio is lowered to a low gear side. As a result, the vehicle 1 can acquire a target acceleration (driving force), and can make the actual vehicle speed of the vehicle 1 to the target speed. In addition, it is possible to provide a running performance of a good mileage during a situation that the target acceleration is realizable (during a period until the output becomes insufficient).

(3-4-1) Target Gear Ratio Calculation Process

FIG. 8 is a flowchart illustrating an example of the processing procedure of the target gear ratio calculation process, and illustrates a detailed processing procedure of the target gear ratio calculation process of steps S503 and S508 of FIG. 7. Further, the target gear ratio calculation process of steps S503 and S508 of FIG. 7 is common with the calculation method while an input time is different. Hereinbelow, a specific calculation method after T seconds will be described using the case of step S503 of FIG. 7 as an example.

According to FIG. 8, first, in step S601, the running resistance value "LRoad(($\theta$), v*(T), a*(T), $\mu$(T), M)" after T seconds is calculated with respect to the time information "T" set by the transmission controller 35. A general relational expression of the running resistance value is defined by the following expression (Math. 2). Further, Math. 2 is an example of a usable arithmetic expression, and other arithmetic expressions may be used in the present embodiment if the running resistance value after T seconds from the current time can be calculated.

$$L_{Road}(\theta(T),v^*(T),a^*(T),\mu(T),M) = air \cdot v^*(T)^2 + \mu(T) \cdot M \cdot g \cdot \cos\theta(T) + M \cdot g \cdot \sin\theta(T) + (M+M_i)a^*(T)$$ [Math. 2]

air: Air resistance and Constant
$\mu$(T): Rolling resistance after T seconds
M: Vehicle mass
g: Gravitational acceleration (Constant)
$M_i$: Equivalent inertial mass of rotation part of driving mechanism (Constant)
$\theta$(T): Gradient information after T seconds
v*(T): Target vehicle speed after T seconds
a*(T): Target acceleration after T seconds Next, in step S602, the required engine output "P_pre(T)" after T seconds is calculated on the basis of the running resistance value obtained in step S601. The following expression (Math. 3) is defined by a general equation of motion which can be used for the calculation of the engine output. Further, the following expression (Math. 4) is an arithmetic expression of the required engine output "P_pre (T)" after T seconds. Further, Math. 3 is an example of the usable arithmetic expression. In the present embodiment, other arithmetic expressions may be used if the engine output after T seconds from the current time can be calculated.

$$Te^*(T) \cdot Ne^*(T) \cdot \frac{1}{Nsec(v^*(T))} \cdot \frac{1}{R} \cdot G_f \cdot \eta_{total} - $$

$$L_{Road}(\theta(T), v^*(T), a^*(T)) = M \cdot a^*(T)$$ [Math. 3]

Te*(T): Required engine torque after T seconds
Ne*(T): Required engine speed after T seconds
Nsec(v*(T)): Secondary rotation speed after T seconds
$\eta_{total}$: Torque transfer efficiency from engine output shaft to drive shaft (constant)
$G_f$: Final gear ratio (Constant)
R: Tire radius (Constant)

$$P\_pre(T) = Te^*(T) \cdot Ne^*(T)/60 \cdot 2\pi$$ [Math. 4]

Next, in step S603, the required target engine speed "Ne*(T)" after T seconds is calculated. Specifically, the engine speed at an operation point where the fuel consumption becomes less may be calculated from a prepared engine characteristic map on the basis of the required engine output "P_pre(T)" after T seconds obtained in step S602.

Next, in step S604, the target gear ratio "Ratio*(T)" after T seconds is calculated on the basis of the calculation results of steps S601 to S603. The following expression (Math. 5) is an example of the arithmetic expression of the target gear ratio "Ratio*(T)" after T seconds. Further, the secondary rotation speed "Nsec" after T seconds can be calculated by multiplying a constant value to the target speed "v*" after T seconds. Therefore, the secondary rotation speed "Nsec(v* (T))" after T seconds calculated by the method is used for a denominator of the left side of Math. 4. In addition, Math. 5 is an example of the usable arithmetic expression, and other arithmetic expressions may be used in the present embodiment if the target gear ratio after T seconds from the current time can be calculated.

$$\frac{Ne^*(T)}{Nsec(v^*(T))} = Ratio^*(T)$$ [Math. 5]

Ne*(T): Required engine speed after T seconds
Nsec(v*(T)): Secondary rotation speed after T seconds Hitherto, with the processes of steps S601 to S604 of FIG. 8, the target gear ratio calculation process ends, and the required engine output "P_pre(T)" after T seconds, the maximum engine output "P_Max_now", and the target engine speed "Ne*(T)" after T seconds are calculated in addition to the target gear ratio "Ratio*(T)" after T seconds (step S503 of FIG. 7). In addition, the target gear ratio calculation process is performed by the same calculation method even in a case where the input time is "t_PLost". Therefore, the required engine output "P_pre(t_PLost)" after t_PLost seconds and the target engine speed "Ne*(t_PLost)" after t_PLost seconds are calculated in addition to the target gear ratio "Ratio*(t_PLost)" after t_PLost seconds (step S508 of FIG. 7).

(3-4-2) Acceleration Securing Process

Figure 9:
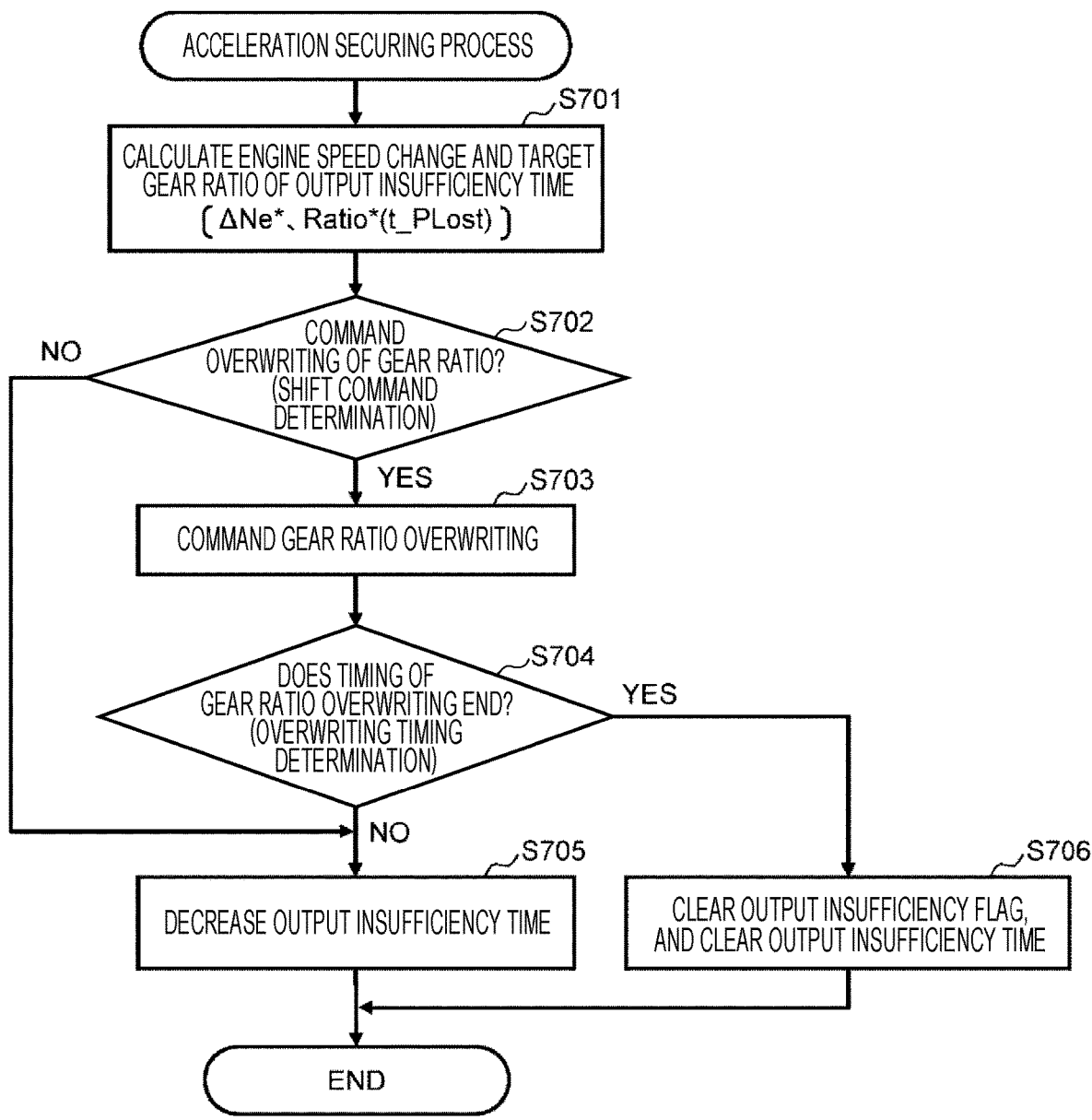
FIG. 9 is a flowchart illustrating an example of the processing procedure of an acceleration securing process.

FIG. 9 is a flowchart illustrating an example of the processing procedure of the acceleration securing process, and illustrates a detailed processing procedure of the acceleration securing process of step S506 of FIG. 7.

The acceleration securing process illustrated in FIG. 9 is a process of overwriting the gear ratio in which the engine speed is changed until a time (the output insufficiency time "t_PLost") when the engine output is insufficient. A timing of shifting the gear ratio is determined such that the overwriting of the gear ratio is commanded to start if the change of the engine speed per unit time falls within a predetermined threshold range.

According to FIG. 9, in step S701, the change "$\Delta Ne^*$" of the engine speed until the output insufficiency time and the target gear ratio "Ratio*(t_PLost)" in the output insufficiency time are calculated to determine whether the overwriting of the gear ratio is performed.

The following expression (Math. 6) is an example of the arithmetic expression of the change "$\Delta Ne^*$" of the engine speed until the output insufficiency time "t_PLost". The following expression (Math. 7) is an example of the arithmetic expression of the target gear ratio "Ratio*(t_PLost)" in the output insufficiency time "t_PLost". Further, these expressions (Math. 6 and Math. 7) are examples of the usable arithmetic expression. In the present embodiment, other arithmetic expressions may be used if the each purpose can be achieved.

$$\frac{Ne^*(t\_PLost) - Ne}{t\_PLost} = \Delta Ne^*$$ [Math. 6]

Ne*(t_PLost): Required engine speed after t_PLost seconds

Ne: Current engine speed $$\frac{Ne^*(t\_PLost)}{Nsec(v^*(t\_PLost))} = \text{Ratio}^*(t\_PLost) \quad [\text{Math. 7}]$$

Ne*(t_PLost): Required engine speed after t_PLost seconds
Nsec(v*(t_PLost)): Secondary rotation speed after t_PLost seconds Next, in step S702, it is determined whether the overwriting command of the gear ratio is performed using the change "ΔNe*" of the engine speed obtained in step S701 (Math. 6) (shift command determination). The shift command determination in step S702 determines whether the relational expression of the following expression (Math. 8) is satisfied for example.

$$m\Delta Ne\_min \leq \Delta Ne^* \quad [\text{Math. 8}]$$

mΔNe_min: Shift command determination threshold (Constant)

In a case where the relational expression of Math. 8 is satisfied, that is, a case where the change "ΔNe*" of the engine speed is equal to or more than a shift command determination threshold (YES of step S702), the process proceeds to step S703 to perform the overwriting command of the gear ratio. On the other hand, in a case where the relational expression of Math. 8 is not satisfied, that is, a case where the change "ΔNe*" of the engine speed is less than the shift command determination threshold (NO of step S702), the process proceeds to step S705, and the output insufficiency time "t_PLost" is decreased (described below).

In step S703, the overwriting of the gear ratio is commanded. Herein, the commanded gear ratio is a gear ratio obtained by multiplying "change restriction" (a constant value set on a program) to the target gear ratio "Ratio* (t_PLost)" in the output insufficiency time "t_PLost" which is obtained in step S701 (Math. 7). Further, instead of a constant value, for example, the value of "change restriction" may be determined by the calculation based on the engine speed per unit time of the change "ΔNe*" of the engine speed which is calculated by Math. 6.

Next, in step S704, it is determined whether the overwriting timing of the gear ratio ends (overwriting timing determination). The overwriting timing determination in step S704 is determined by whether the relational expression of the following expression (Math. 9) is satisfied for example.

$$t\_PLost \leq mT\_sample \quad [\text{Math. 9}]$$

mT_sample: Control period time

In a case where the relational expression of Math. 9 is satisfied, that is, a case where the output insufficiency time "t_PLost" is equal to or less than a predetermined time (control period time "mT_sample"), it is determined that the overwriting timing ends (YES of step S704), and the process proceeds to step S706. On the other hand, in a case where the relational expression of Math. 9 is not satisfied, that is, a case where the output insufficiency time "t_PLost" is larger than the predetermined time (control period time "mT_sample"), it is determined that the overwriting timing does not end (NO of step S704), and the process proceeds to step S705.

Then, in step S705, the output insufficiency time "t_PLost" is decreased. Specifically, for example, a value obtained by subtracting the control period time "mT_sample" from the output insufficiency time "t_PLost" is set to the output insufficiency time "t_PLost" (t_PLost=t_PLost−mT_sample). With such a process, the time "t_PLost" from the current point until the engine becomes insufficient can be decreased in accordance with the next period. After the decreasing process in step S705 is performed, the acceleration securing process ends.

On the other hand, since it is determined in step S706 that the overwriting timing ends in step S704, the decreasing process of step S705 is not necessary, the output insufficiency flag is cleared (OFF), and the output insufficiency time "t_PLost" is cleared (for example, "0"). Thereafter, the acceleration securing process ends.

(3-5) General Control of Transmission Control Process

Hitherto, the transmission control process performed by the transmission controller 35 according to the present embodiment will be described. In the transmission control process, specially illustrated in FIG. 3, plural types of control processes (the deceleration process, the constant vehicle speed switching process, the fuel consumption priority transmission process, and the acceleration switching process) are performed according to the target acceleration/deceleration state of the vehicle 1. In other words, an appropriate control process is performed according to a running situation in a continuous running of the vehicle 1.

Hereinbelow, a general control of the vehicle 1 according to the transmission control process will be described as an example.

FIG. 10 is a diagram for describing an example of a change in various types of parameters according to the transmission control process. In FIGS. 10(A) to 10(D), the horizontal axis is a time axis, and the vertical axis represents a change where different parameters are assigned. Specifically, a change of the speed "V" (the actual vehicle speed and the target speed) of the vehicle 1 is illustrated in FIG. 10(A), a change of the engine speed "Ne" is illustrated in FIG. 10(B), a change of the gear ratio "Ratio" is illustrated in FIG. 10(C), and a change of the fuel cut (F/C) signal is illustrated in FIG. 10(D).

In addition, the target acceleration/deceleration state of the vehicle 1 is continuously changed over time "t0 to t4" of FIG. 10. Specifically, each control process of the transmission control process is performed as follows. As the running situation of the vehicle 1 in time "t0 to t4", a situation that the vehicle enters a corner during the automatic driving control and exits the corner may be assumed for example.

(3-5-1) Time "t0 to t1"

In FIG. 10, time "t0 to t1" corresponds to an execution period of the deceleration process (step S107). For example, when the vehicle 1 enters a corner, the deceleration process is performed until the vehicle is sufficiently decelerated.

At this time, a deceleration control process is performed as the target speed is decelerated. Therefore, a fuel cut command is output from the engine controller 33 to the engine 11. Therefore, as illustrated in FIG. 10(D), the fuel cut (F/C) signal is turned ON.

In addition, a speed control and a pad brake control are adjusted while the distribution thereof is adjusted such that the fuel cut is performed continuously during the deceleration period. Therefore, as illustrated in FIG. 10(C), the gear ratio is changed toward the Low side. As illustrated in FIG. 10(B), the engine speed is increased not so much, and the fuel cut can continue.

(3-5-2) Time "t1 to t2"

In FIG. 10, time "t1 to t2" corresponds to an execution period of the constant vehicle speed switching process (step S108). For example, after the vehicle 1 enters a corner and is sufficiently decelerated, the constant vehicle speed switching process is performed to prepare the running around the corner at the constant vehicle speed.

At this time, with the constant vehicle speed switching process, the engine speed when the deceleration ends and the engine speed of the fuel consumption priority transmission process in a running section thereafter (time "t2 to t3") are calculated. The control is performed to smoothen a difference of both engine speeds so as to change the engine speed within a certain restricted range.

As described above, the gear ratio is largely changed (toward the High side) according to FIG. 10(C) in order to smoothly change the engine speed.

(3-5-3) Time "t2 to t3"

In FIG. 10, time "t2 to t3" corresponds to an execution period of the fuel consumption priority transmission process (step S106). For example, after the vehicle 1 enters a corner and the switching process to the constant vehicle speed ends, the fuel consumption priority transmission process is performed during a period when the vehicle runs around a corner at the constant vehicle speed.

At this time, with the fuel consumption priority transmission process, the F/B control of the vehicle speed is performed such that the operation is performed at an operation point where the fuel consumption is less on the equal output line of the engine output map. For example, according to FIG. 10(A), the actual vehicle speed follows almost the target speed. According to FIG. 10(B), the running state of a high mileage is maintained without a large change even in the engine speed.

(3-5-4) Time "t3 to t4"

In FIG. 10, time "t3 to t4" corresponds to an execution period of the acceleration switching process (step S109). For example, when the vehicle 1 having ran at the constant vehicle speed exits the corner, the acceleration switching process is performed to prepare an acceleration state from an acceleration point (time "t4") where the target acceleration becomes high.

At this time, with the acceleration switching process, the gear ratio is largely changed (or the engine speed is increased) up to the acceleration point such that the engine output required for the target acceleration is obtained at the acceleration point of time "t4". Specifically, for example, the engine speed is increased high as illustrated in FIG. 10(B). On the other hand, as illustrated in FIG. 10(C), the gear ratio is increased high, so that the vehicle speed is maintained at a constant speed (see FIG. 10(A)).

However, when the gear ratio and the engine speed are changed in the acceleration switching process, a predetermined restriction is set to the change of the gear ratio with respect to time (or the change per time of the engine speed). Therefore, a steep change is prevented, so that the degradation of drivability is suppressed.

Then, with the acceleration switching process, the engine speed is increased high at the acceleration point of time "t4", so that the engine operation satisfying the target acceleration can be realized at the operation point. Therefore, it is possible to improve drivability during acceleration.

As described above, according to the transmission controller 35 of the present embodiment, the automatic control driving according to the running state can be realized while taking the running state of the vehicle 1 into consideration. In particular, even while the fuel consumption is maintained by cutting fuel in a deceleration section, the gear ratio or the engine speed in the constant vehicle speed section followed by the following acceleration section is adjusted, so that it is expected that the drivability in the acceleration section is improved.

Further, in FIG. 10, the running state that the vehicle runs around a corner after decelerating at the time of entering the corner and exits the corner has been described as an example. However, the features of the transmission control process of the transmission controller 35 according to the present embodiment are not limited to the above example. For example, the present invention may be applied to a driving scene at the time of entering an expressway or immediately before and after acceleration of a joint. More specifically, the gear ratio may be changed gradually from a state before the acceleration to realize the gear ratio required for the acceleration at the acceleration point.

REFERENCE SIGNS LIST 1 vehicle
11 engine
12 torque converter
13 transmission
14 differential device
15 tire
16 hydraulic control circuit
17 braking device
18 primary rotation sensor
19 secondary rotation sensor
20 vehicle mass sensor
21 lock-up clutch
22, 23 solenoid
31 environment information calculation device
32 target value generation device
33 engine controller
34 brake controller
35 transmission controller
110 normal shift control unit
111 target gear ratio calculation unit
112 hydraulic control command unit
120 automatic shift control unit
121 running resistance calculation unit
122 output calculation unit
123 target engine speed calculation unit
124 target gear ratio calculation unit
125 shift timing calculation unit
126 gear ratio overwriting command unit

The invention claimed is:

1. A transmission control device which controls a transmission in a running control of a vehicle to accelerate the vehicle in an acceleration section after decelerating the vehicle in a deceleration section, the transmission control device comprising:
a shift timing calculation unit which determines an acceleration position at which the vehicle accelerates on a basis of a target speed pattern generated from external information;
a target gear ratio calculation unit which determines a required gear ratio which is required at the acceleration position; and
a gear ratio overwriting command unit which outputs a command of overwriting the gear ratio such that the gear ratio at the acceleration position approaches the required gear ratio,
wherein the gear ratio is set to the required gear ratio at a predetermined point after the vehicle exits the deceleration section until reaching the acceleration position.

2. The transmission control device according to claim 1, wherein the gear ratio overwriting command unit performs a feed-back control on the gear ratio on a basis of a difference between the target speed pattern and an actual speed, and performs the command of overwriting the gear ratio by priority over the feed-back control such that the gear ratio approaches the required gear ratio.

3. The transmission control device according to claim 1, wherein the gear ratio is suppressed from being set to the required gear ratio during the deceleration section.

4. The transmission control device according to claim 1, wherein a point where the required gear ratio is set is determined on a basis of a target speed or a target acceleration in the acceleration position.

5. The transmission control device according to claim 1, wherein the gear ratio in a section from the deceleration section up to the acceleration position is changed on a basis of the external information.

6. The transmission control device according to claim 1, wherein, in a case where an obstacle is detected in the external information, the target speed pattern generated from the external information is changed.

* * * * *